(12) United States Patent
Schaible et al.

(10) Patent No.: US 8,199,529 B2
(45) Date of Patent: Jun. 12, 2012

(54) INDUCTORLESS ISOLATED POWER CONVERTERS WITH ZERO VOLTAGE AND ZERO CURRENT SWITCHING

(75) Inventors: Todd Martin Schaible, Orono, MN (US); Neil Bryan Adams, Burnsville, MN (US)

(73) Assignee: Astec International Limited, Kwun Tong, Kowloon (HK)

( * ) Notice: Subject to any disclaimer, the term of this patent is extended or adjusted under 35 U.S.C. 154(b) by 744 days.

(21) Appl. No.: 12/204,418

(22) Filed: Sep. 4, 2008

(65) Prior Publication Data

US 2010/0054008 A1    Mar. 4, 2010

(51) Int. Cl.
*H02M 3/335* (2006.01)
(52) U.S. Cl. ............... 363/17; 363/89; 363/98; 363/127
(58) Field of Classification Search .................... 363/16, 363/17, 20, 21.06, 21.14, 24, 89, 95, 97, 363/98, 127
See application file for complete search history.

(56) References Cited

U.S. PATENT DOCUMENTS

| | | | | |
|---|---|---|---|---|
| 5,500,791 | A * | 3/1996 | Kheraluwala et al. | 363/17 |
| 5,745,358 | A * | 4/1998 | Faulk | 363/95 |
| 5,805,432 | A * | 9/1998 | Zaitsu et al. | 363/16 |
| 5,946,207 | A * | 8/1999 | Schoofs | 363/127 |
| 5,991,172 | A * | 11/1999 | Jovanovic et al. | 363/21.14 |
| 6,061,252 | A * | 5/2000 | Hosotani | 363/16 |
| 6,229,717 | B1 * | 5/2001 | Corral Blanco et al. | 363/21.14 |
| 6,301,128 | B1 * | 10/2001 | Jang et al. | 363/17 |
| 6,373,726 | B1 * | 4/2002 | Russell | 363/21.14 |
| 6,373,727 | B1 * | 4/2002 | Hedenskog et al. | 363/21.14 |
| 6,438,009 | B2 * | 8/2002 | Assow | 363/127 |
| 6,728,118 | B1 * | 4/2004 | Chen et al. | 363/24 |
| 6,934,166 | B2 * | 8/2005 | Vinciarelli | 363/17 |
| 7,092,260 | B2 * | 8/2006 | Berghegger | 363/21.06 |
| 7,120,036 | B2 * | 10/2006 | Kyono | 363/21.06 |
| 7,149,097 | B1 * | 12/2006 | Shteynberg et al. | 363/16 |
| 7,184,280 | B2 * | 2/2007 | Sun et al. | 363/21.02 |
| 7,352,596 | B2 | 4/2008 | Cheng | |
| 7,551,459 | B1 * | 6/2009 | Wittenbreder, Jr. | 363/21.06 |
| 7,660,136 | B2 * | 2/2010 | Yang | 363/21.06 |
| 7,688,602 | B2 * | 3/2010 | Hu | 363/21.14 |
| 7,764,518 | B2 * | 7/2010 | Jitaru | 363/21.12 |
| 7,787,264 | B2 * | 8/2010 | Yang et al. | 363/21.06 |
| 7,903,436 | B2 * | 3/2011 | Strijker | 363/21.14 |
| 7,911,813 | B2 * | 3/2011 | Yang et al. | 363/21.06 |

(Continued)

OTHER PUBLICATIONS

"A New High Efficiency Phase Shifted Full Bridge Converter for Sustaining Power Module of Plasma Display Panel," W. Lee, C. Kim, S. Han and G. Moon; Korea Advanced Institue of Science and Technology; pp. 2630-2634.

(Continued)

*Primary Examiner* — Jeffrey Sterrett

(74) *Attorney, Agent, or Firm* — Harness, Dickey & Pierce, P.L.C.

(57) ABSTRACT

A method of controlling an isolated switching power converter that includes a transformer with a primary side and a secondary side, at least one primary switch coupled to the primary side of the transformer and at least one synchronous rectifier coupled to the secondary side of the transformer is disclosed. The method includes turning on the synchronous rectifier a first fixed time after turning on the primary switch and turning off the synchronous rectifier a second fixed time after turning off the primary switch. Power converters for operation according to this method are also disclosed, including power converters without an output inductor.

25 Claims, 9 Drawing Sheets

U.S. PATENT DOCUMENTS

2003/0112645 A1* 6/2003 Schlecht .................. 363/89
2007/0247880 A1 10/2007 Kwon et al.

OTHER PUBLICATIONS

"Half Bridge Forward/Flyback Converter with ZVS Switching,"; Lai Ming Ng; 2007; 7 pages.

"Switching Power Supply Design," Abraham Pressman, Second Edition, 1998; pp. 170-175.

"Inductorless versus Inductor-Based Integrated Switching Regulators: Bill of Material, Efficiency, Noise, and Reliability Comparisons," Mathieu Renaud and Yves Gagnon; 2006; 9 pages.

"5V/50mA Low Noise Inductorless Boost Converter," AS1301 Data Sheet; www.austriamicrosystems.com; 1997-2008; pp. 1-16.

* cited by examiner

INDUCTORLESS ISOLATED POWER CONVERTERS WITH ZERO VOLTAGE AND ZERO CURRENT SWITCHING

FIELD

The present disclosure relates to isolated switching power converters.

BACKGROUND

The statements in this section merely provide background information related to the present disclosure and may not constitute prior art.

Isolated switching power converters typically include a transformer, one or more primary switches coupled to a primary winding of the transformer, and an output capacitor, inductor and rectifier coupled to a secondary winding of the transformer. For example, the full-bridge power converter 100 in FIG. 1 includes a transformer TX1 having a primary side including a primary winding 110 and a secondary side including a secondary winding 120. Primary switches Q1-Q4 are connected to the primary side for switching an input voltage Vin across the primary winding 110. On the secondary side, the secondary winding 120 is connected to an output inductor L1, output capacitor C1 and a pair of synchronous rectifiers Q5, Q6. The output inductor L1 stores and release energy and operate as a filter choke in the power converter 100. Because primary switches Q1-Q4 typically switch on and off with a voltage across them, losses occur during switching. Additionally, the synchronous rectifiers Q5, Q6 each include a body diode 130. Current flowing through the synchronous rectifiers Q5, Q6 when they turn off causes the body diode 130 to conduct, leading to reverse recovery voltage spikes on the synchronous rectifiers Q5, Q6. The switches, commonly MOSFETs, for the synchronous rectifiers Q5, Q6 are generally chosen for, among other things, their ability to withstand high voltage of the reverse recovery voltage spikes.

SUMMARY

This section provides a general summary of the disclosure, and is not a comprehensive disclosure of its full scope or all of its features.

According to one aspect of the present disclosure, an isolated switching power converter includes a transformer having a primary winding and a secondary winding, a primary side circuit coupled to the primary winding, and a secondary side circuit coupled to the secondary winding. The primary side circuit includes an input for receiving an input voltage and at least one primary switch for switching a voltage across the primary winding. The secondary side circuit includes an output for providing an output voltage and at least one rectifier. The secondary side circuit does not include an output inductor.

According to another aspect of the present disclosure, a method of controlling an isolated switching power converter is disclosed. The isolated switching power converter includes a transformer with a primary winding and a secondary winding, at least one primary switch coupled to the primary winding of the transformer and at least one synchronous rectifier coupled to the secondary winding of the transformer. The power converter includes a controller configured to switch the primary switch and the synchronous rectifier, and the power converter does not include an output inductor. The method includes switching on the primary switch to provide a first current through the primary winding to induce a second current in the secondary winding and switching on the synchronous rectifier a first fixed time after switching on the primary switch to allow the second current to flow.

According to yet another aspect of the present disclosure an inductorless isolated switching power converter includes a transformer having a primary winding and a secondary winding, a primary side circuit coupled to the primary winding, a secondary side circuit coupled to the secondary winding, and a controller for switching the primary switch and the synchronous rectifier. The primary side circuit includes an input for receiving an input voltage and at least one primary switch for switching a voltage across the primary winding. The secondary side circuit includes an output for providing an output voltage and at least one synchronous rectifier and the secondary side circuit does not include an output inductor. The controller is configured to switch the primary switch and the synchronous rectifier to restrict body diode conduction in the synchronous rectifier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure FIG. 1 is a circuit diagram of full-bridge power converter including an output inductor.

Corresponding reference numerals indicate corresponding parts throughout the several views of the drawings.

DETAILED DESCRIPTION

Figure 1:
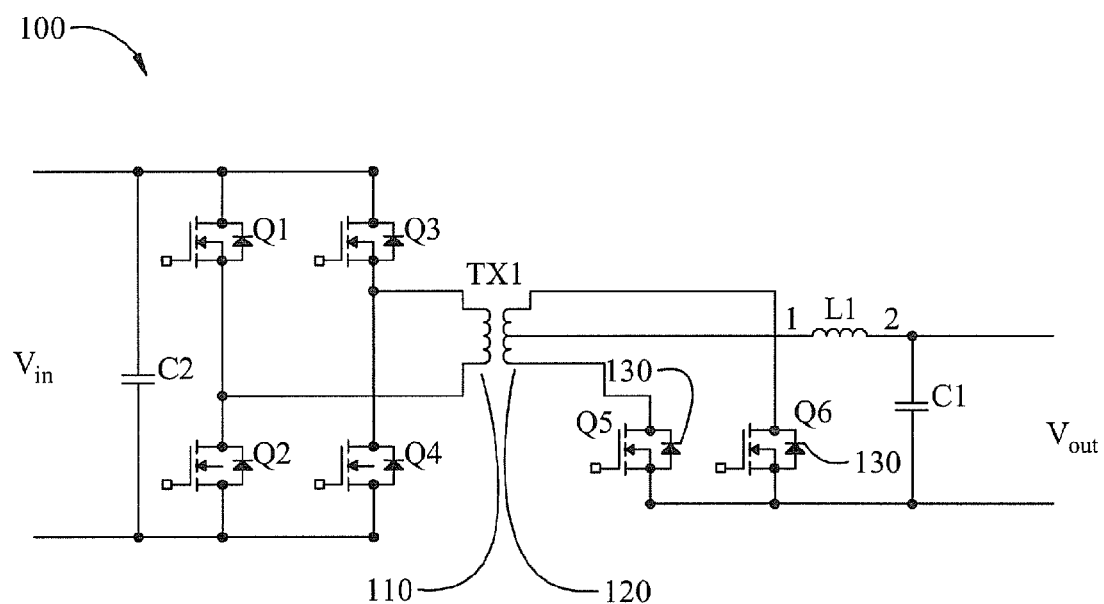

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

According to one aspect of the present disclosure an isolated switching power converter includes a transformer having a primary winding and a secondary winding, a primary side circuit coupled to the primary winding and a secondary side circuit coupled to the secondary winding. The primary side circuit includes an input for receiving an input voltage and at least one primary switch for switching a voltage across the primary winding. The secondary side circuit includes an output for providing an output voltage and at least one rectifier. The secondary side circuit does not include an output inductor. In this manner, power converter part count is decreased and power density is increased.

According to another aspect of the present disclosure, a method of controlling an isolated switching power converter including a transformer with a primary winding and a secondary winding is disclosed. The power converter includes at least one primary switch coupled to the primary winding of the transformer and at least one synchronous rectifier coupled to the secondary winding of the transformer. The power converter also includes a controller configured to switch the primary switch and the synchronous rectifier and does not include an output inductor. The method includes switching on the primary switch to provide a first current through the primary winding to induce a second current in the secondary winding and switching on the synchronous rectifier a first fixed time after switching on the primary switch to allow the second current to flow. In this manner power converter part count is decreased and power density is increased. The synchronous rectifier can switch at near zero current switching and the primary switch can switch at near zero voltage switching.

According to yet another aspect of the present disclosure an inductorless isolated switching power converter includes a transformer having a primary winding and a secondary winding, a primary side circuit coupled to the primary winding, and a secondary side circuit coupled to the secondary winding. The primary side circuit includes an input for receiving an input voltage and at least one primary switch for switching a voltage across the primary winding. The secondary side circuit includes an output for providing an output voltage and at least one synchronous rectifier. The secondary side circuit does not include an output inductor. The power converter further includes a controller for switching the primary switch and the synchronous rectifier. The controller is configured to switch the primary switch and the synchronous rectifier to restrict body diode conduction in the synchronous rectifier. In this manner power converter part count is decreased and power density is increased. Reverse recovery voltage spikes are also restricted or eliminated permitting use of lower voltage rated switches for the synchronous rectifier.

An exemplary power converter according to one or more of these aspects will be discussed with reference to FIGS. 2-5C. It should be understood, however, that other power converters can be used to implement one or more aspects without departing from the scope of this disclosure.

Figure 2:
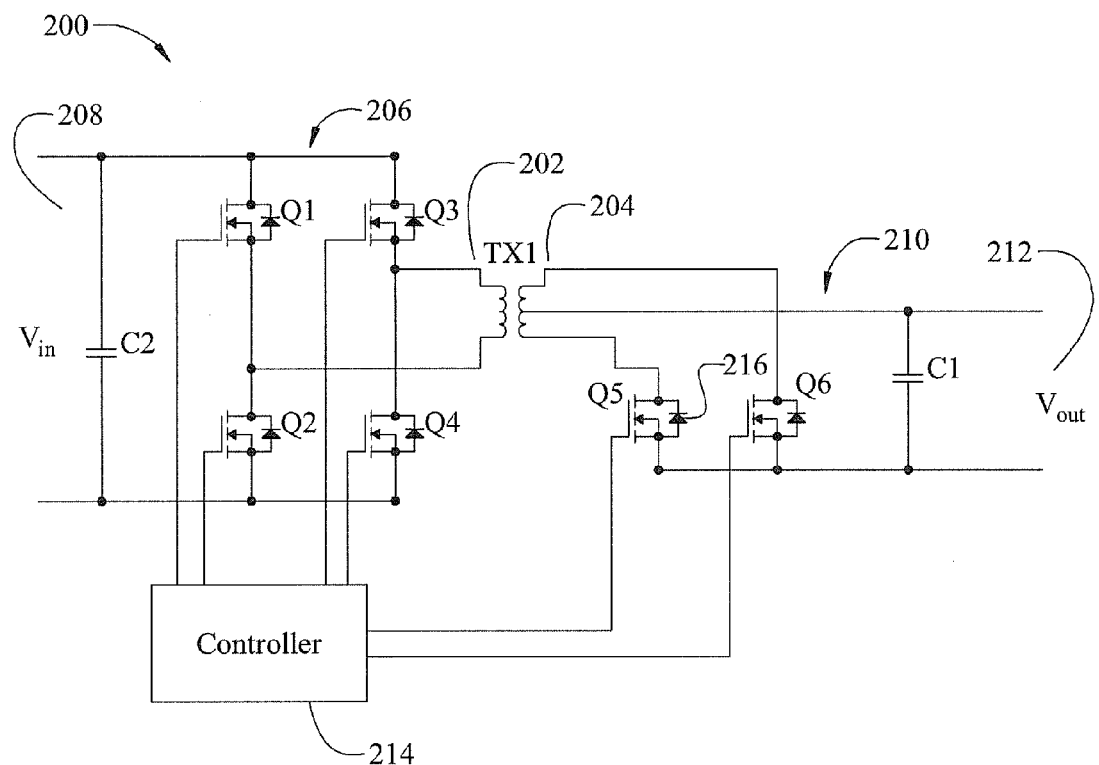
FIG. 2 is a circuit diagram of an inductorless full-bridge power converter including a controller.

An isolated switching power converter, generally indicated by reference numeral 200 is illustrated in FIG. 2. The power converter includes a transformer TX1 having a primary winding 202 and a secondary winding 204. A primary side circuit 206 including an input 208 for receiving an input voltage Vin and four switches Q1-Q4 is coupled to the primary winding 202. The switches Q1-Q4 switch a voltage across the primary winding 202. A secondary side circuit 210 including rectifiers Q5, Q6 and an output 212 for providing an output voltage Vout is coupled to the secondary winding 204. It will be noted that the power converter 200 does not include an output inductor.

Although the power converter 200 is a full-bridge converter, it should be understood that any suitable isolated switching power converter topology, for example flyback converters, half-bridge converters, forward converters, etc. may be used. The rectifiers Q5, Q6 are synchronous rectifiers, but may be diodes. Although primary switches Q1-Q4 and rectifiers Q5, Q6 are illustrated as N-channel MOSFETS, any other suitable switches, e.g., P-channel MOSFETS, bipolar transistors, J-FETS, etc., can be used.

The power converter 200 includes a controller 214 for switching, i.e. turning on and off, the primary switches Q1-Q4 and the rectifiers Q5, Q6 at the appropriate times. Alternatively, the rectifiers Q5, Q6 may be self driven synchronous rectifiers.

The controller 214 is configured to operate the power converter 200 with a duty cycle near 100%. Such operation permits omission of an output inductor in the power converter 200. The power converter 200 need not operate at exactly 100% duty cycle, and can be operated with a duty cycle between about 95% and 100%. When the duty cycle is lower than about 95%, ripple voltage on the output voltage Vout may exceed an acceptable range unless an output inductor and/or a large output capacitor is added to the power converter 200.

Figure 3A:
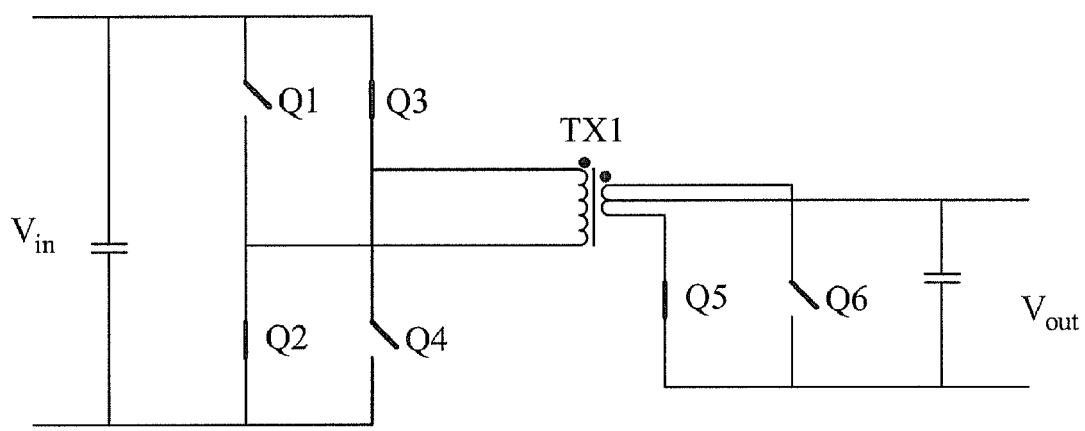
FIG. 3A is a simplified circuit diagram of the converter of FIG. 2 in operation before a time t0.
Figure 3B:
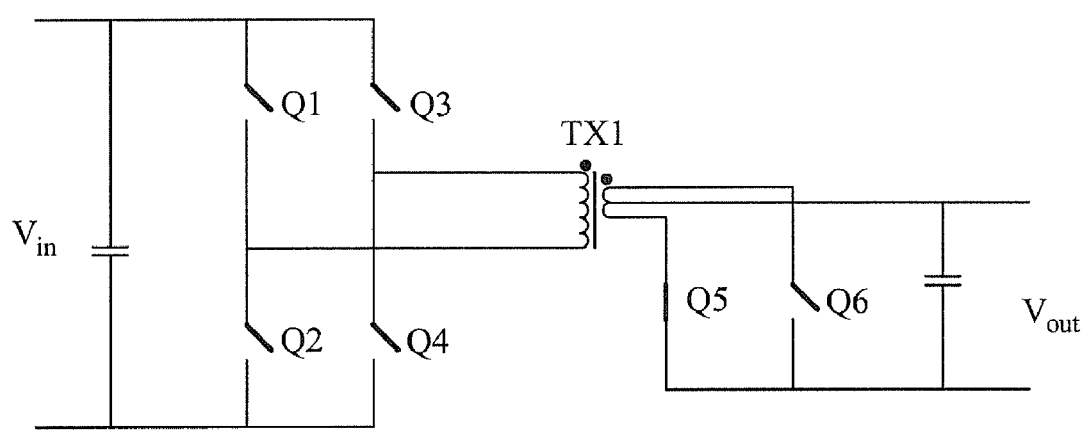
FIG. 3B is a simplified circuit diagram of the converter of FIG. 2 in operation at a time t0.
Figure 3C:
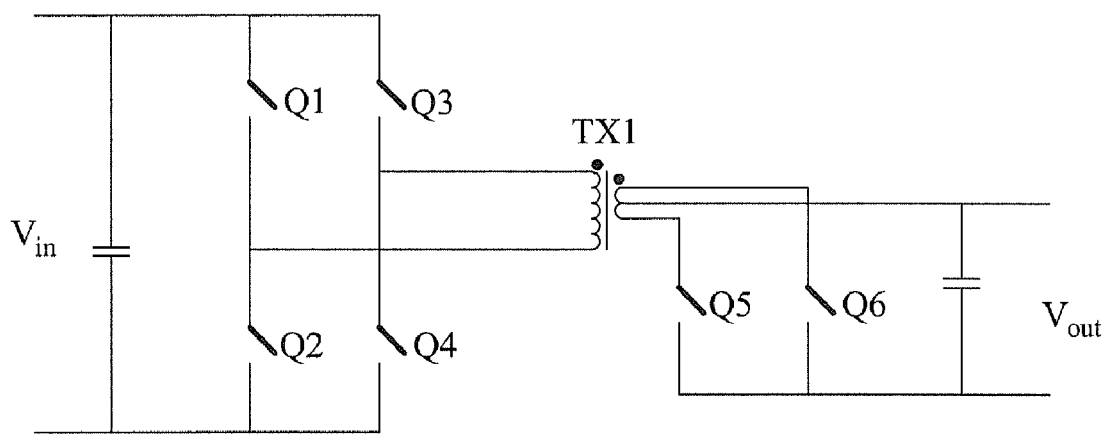
FIG. 3C is a simplified circuit diagram of the converter of FIG. 2 in operation at a time t1.
Figure 3D:
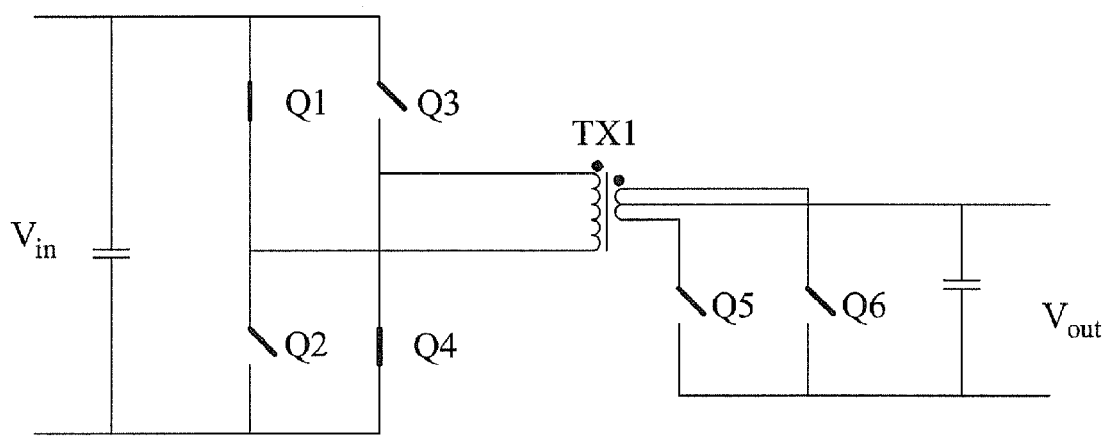
FIG. 3D is a simplified circuit diagram of the converter of FIG. 2 in operation at a time t2.
Figure 3E:
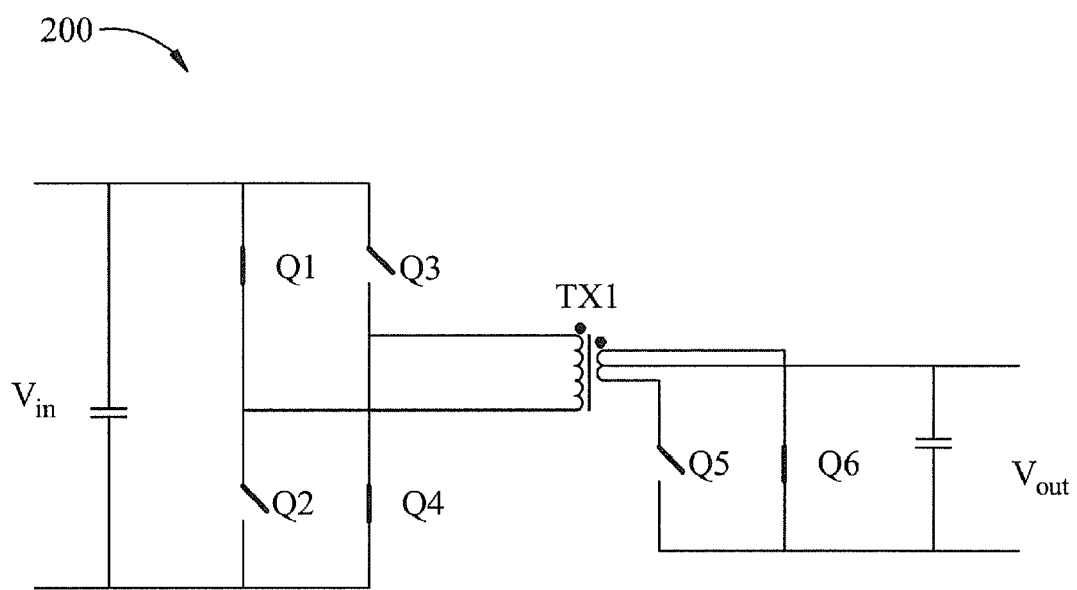
FIG. 3E is a simplified circuit diagram of the converter of FIG. 2 in operation at a time t3.
Figure 4:
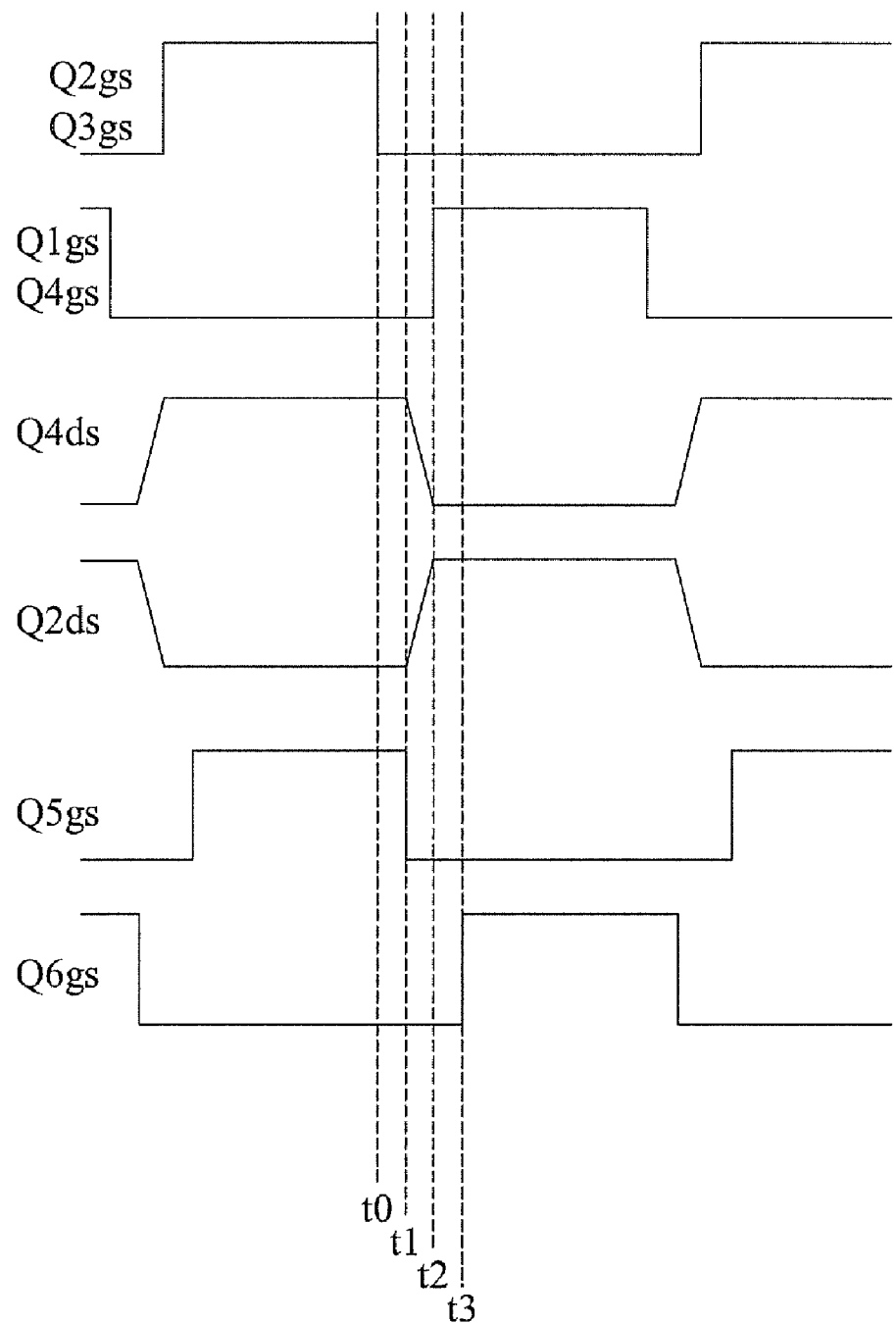
FIG. 4 is a graphical representation of control signals for the primary switches and synchronous rectifiers and the voltage across the primary switches of the converter of FIG. 2 during operation from before t0 until after t3.

Further explanation of the operation of the power converter 200 is illustrated by the simplified circuit diagrams in FIGS. 3A-3E and the graph in FIG. 4. Generally, the controller 214 is configured to switch the primary switches Q1-Q4 alternately in groups of two and to alternately switch the rectifiers Q5, Q6 with a respective group of two of the primary switches Q1-Q4.

In FIG. 3A, switches Q2 and Q3 are on and switches Q1 and Q4 are off. The rectifier Q5 is also on, while rectifier Q6 is off. This represents the power converter 200 before a time t0. As shown in FIG. 4, there is a voltage present across open switches Q1 and Q4, while closed switches Q2 and Q3 have no voltage across them.

At time t0, switches Q2 and Q3 are opened as shown in FIG. 3B. Rectifier Q5, however, remains on for a short time, i.e. until t1. The controller 214 is configured to switch off the rectifier Q5 a short time after switching off primary switches Q2, Q3. The length of such a time delay depends upon the specific components and parasitics, e.g. parasitic capacitance, leakage inductance, etc., in the power converter 200. Like any real transformer, the transformer TX1 includes a magnetizing inductance and a leakage inductance. For simplicity and clarity, the magnetizing and leakage inductances, which are inherent properties of the transformer TX1, are not separately illustrated. Transformer leakage inductance is a primary factor in determining the appropriate time delay. The greater the transformer leakage inductance, the greater the time delay. The time delay for switching off rectifier Q5 is about 50 nanoseconds in some embodiments.

The delay in turning off the rectifier Q5 causes the output voltage Vout of the power converter 200 to be reflected back to the primary side of the transformer TX1. This reflected voltage keeps the voltage across switches Q1 and Q4 high and keeps the voltage across switches Q2 and Q3 low, i.e. near zero. Thus, when the primary switches Q2, Q3 open, or turn off, they will be turning off at substantially zero volts, i.e. zero voltage switching (ZVS). Leakage inductance in the transformer TX1 may cause a small induced voltage across the primary switches Q2, Q3. This voltage can be reduced to get closer to zero volts across the opening primary switches Q2, Q3. Switching off the primary switches Q2, Q3 at a slower rate decreases the rate of change of current, i.e., di/dt, thereby decreasing the induced voltage. Thus, by proper transformer and turn off rate selection, near ZVS can be achieved for switching off the primary switches Q2, Q3.

Between times t0 and t1, current in the secondary side circuit 210 quickly decreases because there is no output inductor to permit continued current flow through the secondary side circuit 210. Current through the rectifier Q5 quickly reduces to a magnetizing current of the transformer TX1.

At time t1, the rectifier Q5 is turned off as illustrated in FIG. 3C. As discussed above, the current through the rectifier Q5 at this time is the magnetizing current of the transformer TX1. Thus, the rectifier Q5 is able to turn off with no, or almost no, current flowing through it. Zero current switching prevents a body diode 216 in the rectifier Q5 from conducting current. Because body diode conduction is prevented, reverse recovery voltage spikes are reduced or eliminated. This reduction of reverse recovery voltage spikes permits lower voltage rated and/or more efficient switches to be used in the power converter.

Between times t1 and t2, magnetizing energy in the transformer TX1 resonates with the parasitic capacitance in the power converter, including drain-source capacitance of switches Q1-Q4. The magnetizing inductance of the transformer TX1 and the parasitic capacitance form an LC tank circuit. As seen in FIG. 4, this rings the voltage across primary switches Q1, Q4 to about zero. Body diodes of the primary switches clamp the voltage across the switches to about zero volts and prevent the switch voltage from ringing to a negative voltage. The resonant frequency of this LC tank is low enough that the primary switches Q1, Q4 will be switched on again before the voltage across them would ring above zero volts. It also similarly rings the voltage across switches Q2 and Q3 high. About time t2, the body diodes of switches Q1 and Q4 begin to conduct the magnetizing current of the transformer TX1.

At time t2, as shown in FIG. 3D, primary switches Q1, Q4 are turned on. As discussed above, and illustrated in FIG. 4, the voltage across primary switches Q1, Q4 is approximately zero at time t2, thus allowing substantially zero voltage switching of primary switches Q1, Q4. Finally, as shown in FIG. 3E, the rectifier Q6 is turned on at time t3. The delay between switching on primary switches Q1, Q4 and switching on rectifier Q6 may be a same or different length of time as the delay in turning off the rectifier Q5 after turning off the primary switches Q2, Q3.

The cycle discussed above is repeated with primary switches Q1 and Q4 and rectifier Q6 beginning in a closed position, i.e. beginning in the same position as primary switches Q2, Q3 and rectifier Q5 in FIG. 3A and continuing with the same operation discussed above. This entire process repeats continuously while the power converter 200 is operating.

Figure 5A:
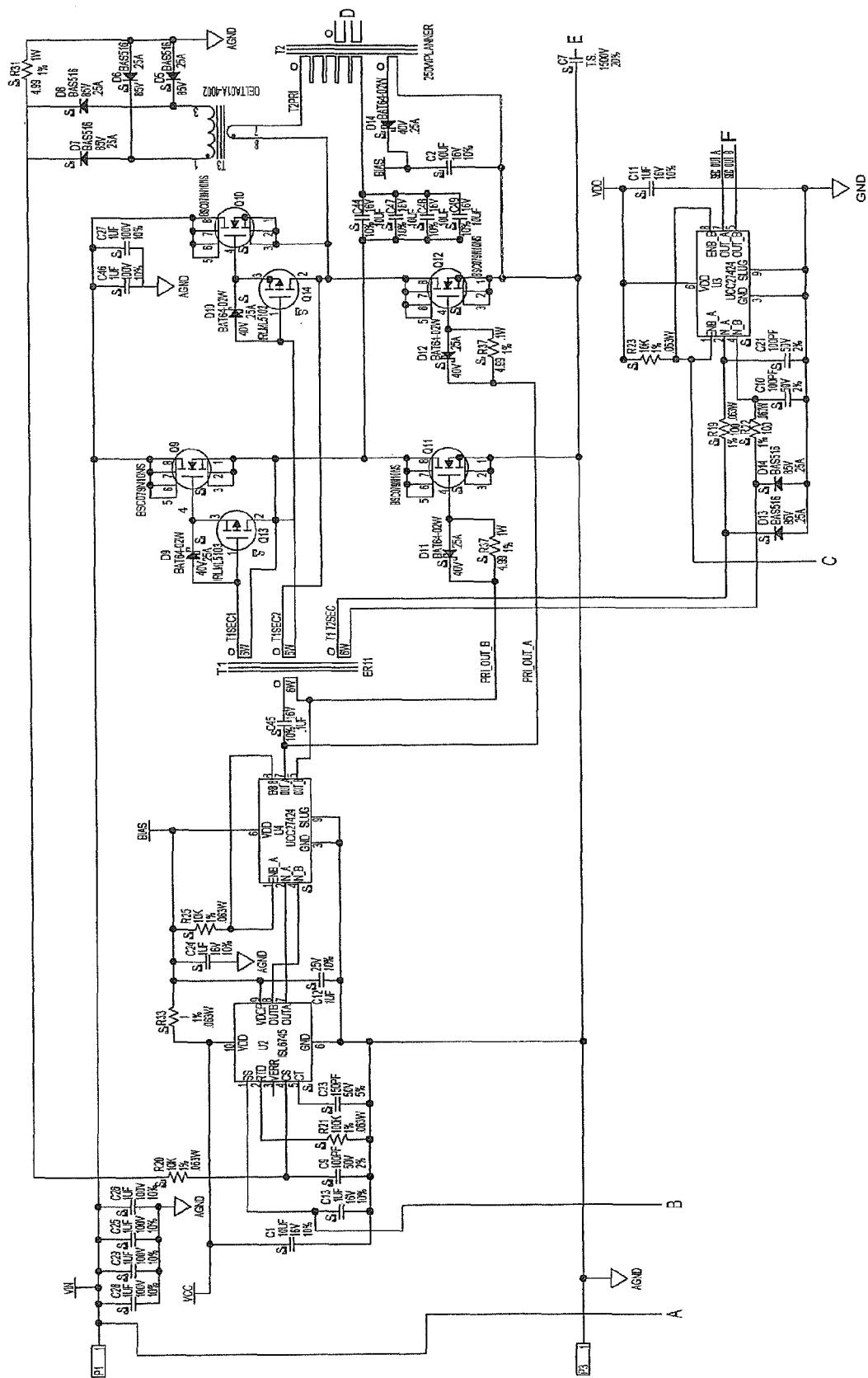
FIG. 5A is a portion of a circuit schematic for an inductorless full-bridge power converter.
Figure 5B:
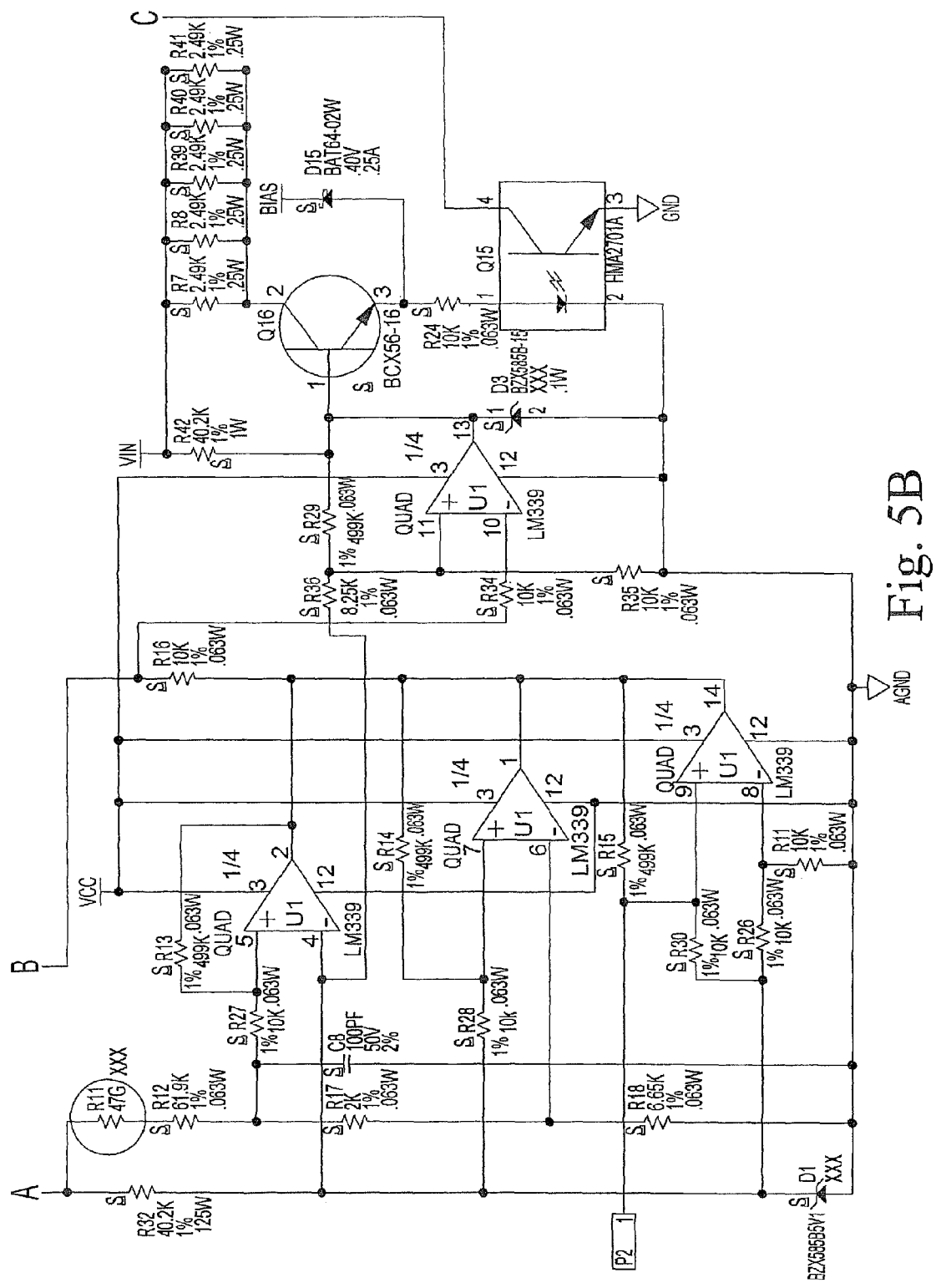
FIG. 5B is another portion of the circuit schematic for the inductorless full-bridge power converter of FIG. 5A.
Figure 5C:
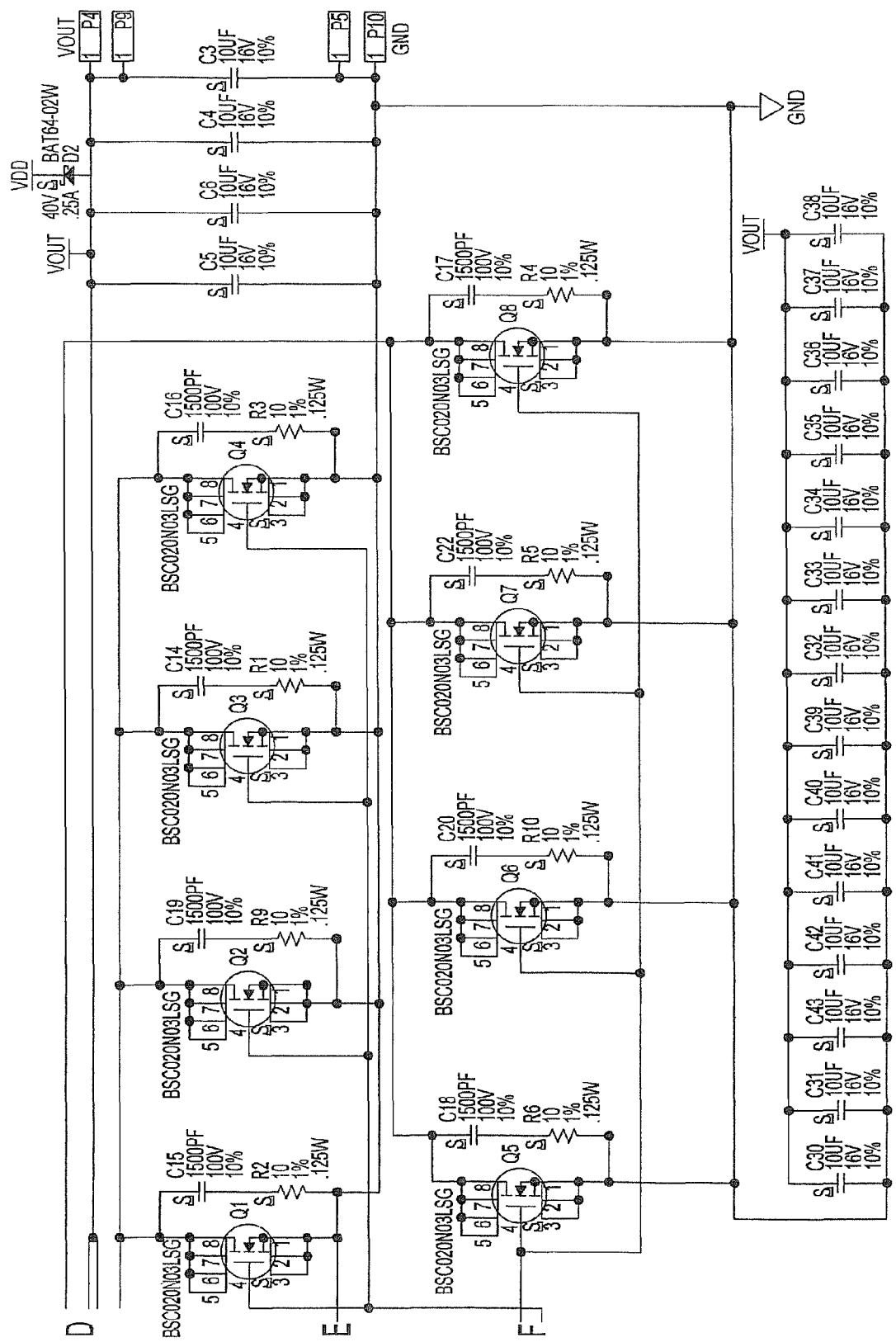
FIG. 5C is another portion of the circuit schematic for the inductorless full-bridge power converter of FIG. 5A.

A full circuit schematic of a power converter according to one or more aspect aspects of the present disclosure is illustrated in FIGS. 5A-5C.

Power converters according to this disclosure are able to have increased density due to the removal of an output inductor. The primary switches achieve near zero voltage switching during turn on and turn off. Further, near zero current switching is achieved for the synchronous rectifiers. This reduces or eliminates synchronous body diode conduction and reverse recovery spikes. Therefore, switching losses in the primary switches are reduced and more efficient and/or lower voltage rated switches can be used for the synchronous rectifiers.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. Terms such as "first," "second," and other numerical terms when used herein do not imply a sequence or order unless clearly indicated by the context. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An isolated switching power converter comprising:
   a transformer having a primary winding and a secondary winding;
   a primary side circuit coupled to the primary winding, the primary side circuit including an input for receiving an input voltage and at least one primary switch for switching a voltage across the primary winding;
   a secondary side circuit coupled to the secondary winding, the secondary side circuit including an output for providing an output voltage and at least one synchronous rectifier, wherein the secondary side circuit does not include an output inductor; and
   a controller configured to switch off the primary switch while the synchronous rectifier is on, and switch off the synchronous rectifier a first fixed time after the switching off of the primary switch when the current through the synchronous rectifier is substantially zero.

2. The isolated power converter of claim 1 wherein the power converter is inductorless.

3. The isolated power converter of claim 1 wherein the power converter is configured to operate with a duty cycle in a range of about ninety five percent to about one hundred percent.

4. The isolated power converter of claim 1 wherein the controller is configured to switch on the synchronous rectifier a second fixed time after switching on the primary switch.

5. The isolated power converter of claim 4 wherein the first fixed time is substantially equal to the second fixed time.

6. The isolated power converter of claim 5 wherein the first fixed time and the second fixed time are about 50 nanoseconds.

7. The isolated power converter of claim 1 wherein the power converter is one of a full-bridge converter, a half-bridge converter, and a forward converter.

8. The isolated power converter of claim 1 wherein the synchronous rectifier is a first synchronous rectifier, the power converter further comprising a second synchronous rectifier, the controller configured to switch off the first synchronous rectifier while the second synchronous rectifier is off.

9. The isolated power converter of claim 8 wherein a current through the first synchronous rectifier when the first synchronous rectifier is switched off is substantially equal to a magnetizing current of the transformer.

10. The isolated power converter of claim 9 wherein a voltage across the primary switch when the primary switch is switched off is about zero volts.

11. The isolated power converter of claim 8 wherein the primary switch is a first primary switch, the power converter further comprising a second primary switch, the controller configured to switch off the first primary switch while the second primary switch is off.

12. The isolated power converter of claim 11 wherein the controller is configured to switch on the second primary switch after switching off the first synchronous rectifier.

13. The isolated power converter of claim 12 wherein a voltage across the second primary switch when the second primary switch is switched on is about zero volts.

14. The isolated power converter of claim 12 wherein the controller is configured to switch on the second synchronous rectifier a second fixed time after switching on the second primary switch.

15. The isolated power converter of claim 14 wherein the power converter is a full-bridge converter further comprising a third primary switch and a fourth primary switch, and the controller is configured to switch the first and third primary switches together as a first group, and to switch the second and fourth primary switches together as a second group.

16. The isolated power converter of claim 14 wherein the controller is configured to switch off the second primary switch while the second synchronous rectifier is on, and switch off the second synchronous rectifier the first fixed time after the switching off of the second primary switch.

17. The isolated power converter of claim 16 wherein the controller is configured to switch on the first primary switch after switching off the second synchronous rectifier.

18. The isolated power converter of claim 17 wherein the controller is configured to switch on the first synchronous rectifier a second fixed time after switching on the first primary switch.

19. A method of controlling an isolated switching power converter including a transformer with a primary winding and a secondary winding, at least one primary switch coupled to the primary winding of the transformer and at least one synchronous rectifier coupled to the secondary winding of the transformer, and a controller configured to switch the primary switch and the synchronous rectifier, the power converter not including an output inductor, the method comprising:
   switching off the primary switch while the synchronous rectifier is on; and
   switching off the synchronous rectifier a first fixed time after the switching off of the primary switch when the current through the synchronous rectifier is substantially zero.

20. The method of claim 19 further comprising switching on the primary switch, and switching on the synchronous rectifier a second fixed time after the switching on of the primary switch.

21. The method of claim 20 wherein the isolated power converter operates with a duty cycle in a range of about ninety five percent to about one hundred percent.

22. The method of claim 20 wherein the first fixed time is substantially equal to the second fixed time.

23. The method of claim 22 wherein the first fixed time and the second fixed time are about 50 nanoseconds.

24. The method of claim 19 wherein a current through the synchronous rectifier when it is switched off is a magnetizing current of the transformer.

25. The method of claim 19 wherein a voltage across the primary switch when it is switched off is about zero volts.

* * * * *

UNITED STATES PATENT AND TRADEMARK OFFICE
CERTIFICATE OF CORRECTION

PATENT NO. : 8,199,529 B2  
APPLICATION NO. : 12/204418  
DATED : June 12, 2012  
INVENTOR(S) : Schaible et al.

Page 1 of 1

It is certified that error appears in the above-identified patent and that said Letters Patent is hereby corrected as shown below:

At column 5, line 60, delete "aspect"

Signed and Sealed this  
Eleventh Day of September, 2012

David J. Kappos  
*Director of the United States Patent and Trademark Office*